(12) United States Patent
Stier

(10) Patent No.: US 8,739,693 B2
(45) Date of Patent: Jun. 3, 2014

(54) CHARCOAL BARBECUE ROTISSERIE GRILL COOKER

(76) Inventor: Randal J. Stier, Central Square, NY (US)

(*) Notice: Subject to any disclaimer, the term of this patent is extended or adjusted under 35 U.S.C. 154(b) by 760 days.

(21) Appl. No.: 12/853,818

(22) Filed: Aug. 10, 2010

(65) Prior Publication Data

US 2012/0037012 A1 Feb. 16, 2012

(51) Int. Cl.
*A47J 37/06* (2006.01)
*A47J 37/07* (2006.01)
*A22C 7/00* (2006.01)
*A23P 1/00* (2006.01)
*A47J 43/18* (2006.01)

(52) U.S. Cl.
USPC .......................................... 99/421 H; 99/427

(58) Field of Classification Search
USPC ..................... 99/421 H, 450, 419, 421 R, 427
See application file for complete search history.

(56) References Cited

U.S. PATENT DOCUMENTS

| | | | |
|---|---|---|---|
| 3,140,651 A * | 7/1964 | Barnett | 99/339 |
| 3,266,478 A * | 8/1966 | Booth | 126/25 R |
| 3,363,543 A | 1/1968 | Roberts et al. | |
| 3,665,840 A | 5/1972 | Horany | |
| 4,061,083 A | 12/1977 | Caliva | |
| 4,170,173 A * | 10/1979 | Bradford | 99/341 |
| 4,442,762 A | 4/1984 | Beller | |
| 4,442,763 A | 4/1984 | Beller | |
| 4,625,634 A | 12/1986 | Kruper | |
| 4,765,232 A * | 8/1988 | Reid | 99/427 |
| 4,882,985 A | 11/1989 | Beller | |
| 5,007,403 A | 4/1991 | Chen | |
| 5,090,398 A * | 2/1992 | Raymer et al. | 126/41 R |
| 5,140,896 A | 8/1992 | Duran | |
| 5,195,423 A | 3/1993 | Beller | |
| 5,325,767 A | 7/1994 | Beller | |
| 5,421,318 A * | 6/1995 | Unruh et al. | 126/25 A |
| 5,445,064 A * | 8/1995 | Lopata | 99/421 H |
| 5,515,774 A | 5/1996 | Swisher et al. | |
| 5,536,518 A | 7/1996 | Rummel | |
| 5,761,991 A | 6/1998 | Kambies | |
| 5,801,357 A * | 9/1998 | Danen | 219/403 |
| 6,035,770 A | 3/2000 | Whitefield | |
| 6,131,562 A * | 10/2000 | Schlosser et al. | 126/41 R |
| 6,658,991 B2 * | 12/2003 | Backus et al. | 99/395 |
| 6,883,514 B1 | 4/2005 | Felicitas et al. | |
| 7,069,842 B1 | 7/2006 | Liao | |
| 7,478,586 B2 * | 1/2009 | Gabrielle | 99/340 |
| 2005/0155498 A1 * | 7/2005 | Killion | 99/482 |

\* cited by examiner

*Primary Examiner* — Henry Yuen
*Assistant Examiner* — Hemant Mathew
(74) *Attorney, Agent, or Firm* — Bernhard P. Molldrem, Jr.

(57) ABSTRACT

A charcoal cooker employs a grill for cooking steaks and a rotisserie for slower cooking of ribs, chicken, turkey, or the like. A tubular spit rod has spike rings that can interchange with a grill basket assembly. The spit rod is hollow tubular stainless steel, with a thicker central portion and smaller diameter end portions. These serve as handles and remain cool to the touch, so the rotisserie spit can be lifted out by grasping the ends to remove the cooked meat for serving. A chain drive engages a sprocket on one end of the spit rod for rotating the spit. Detachable spit support arms mount on the cooker body to hold the spit rod when loading the meat. An external fire box attachment fits onto a coal chute port, so the cooker can be used as an oven for baking or roasting. The legs, lid, grills, and other parts can be detached for cleaning.

12 Claims, 9 Drawing Sheets

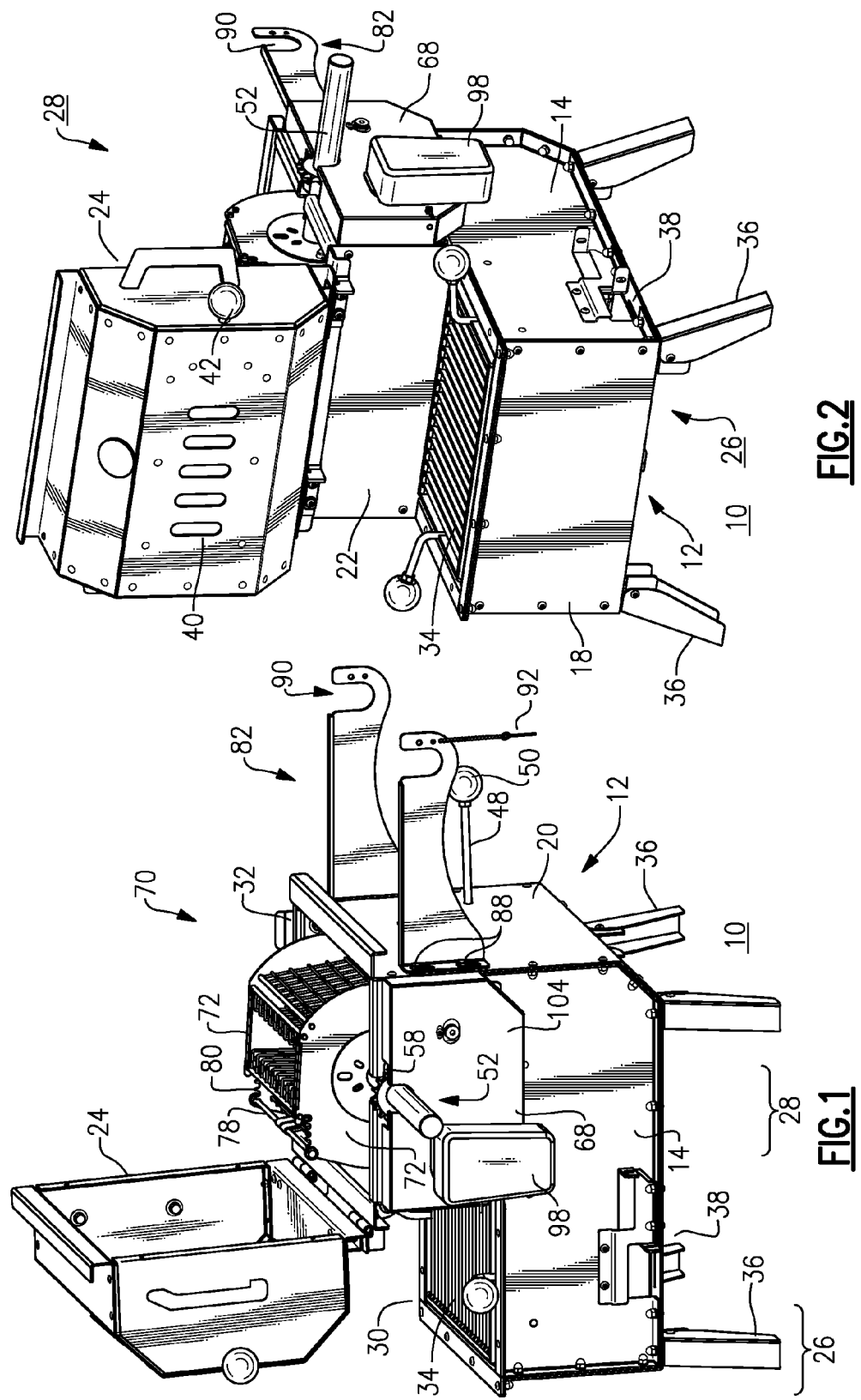

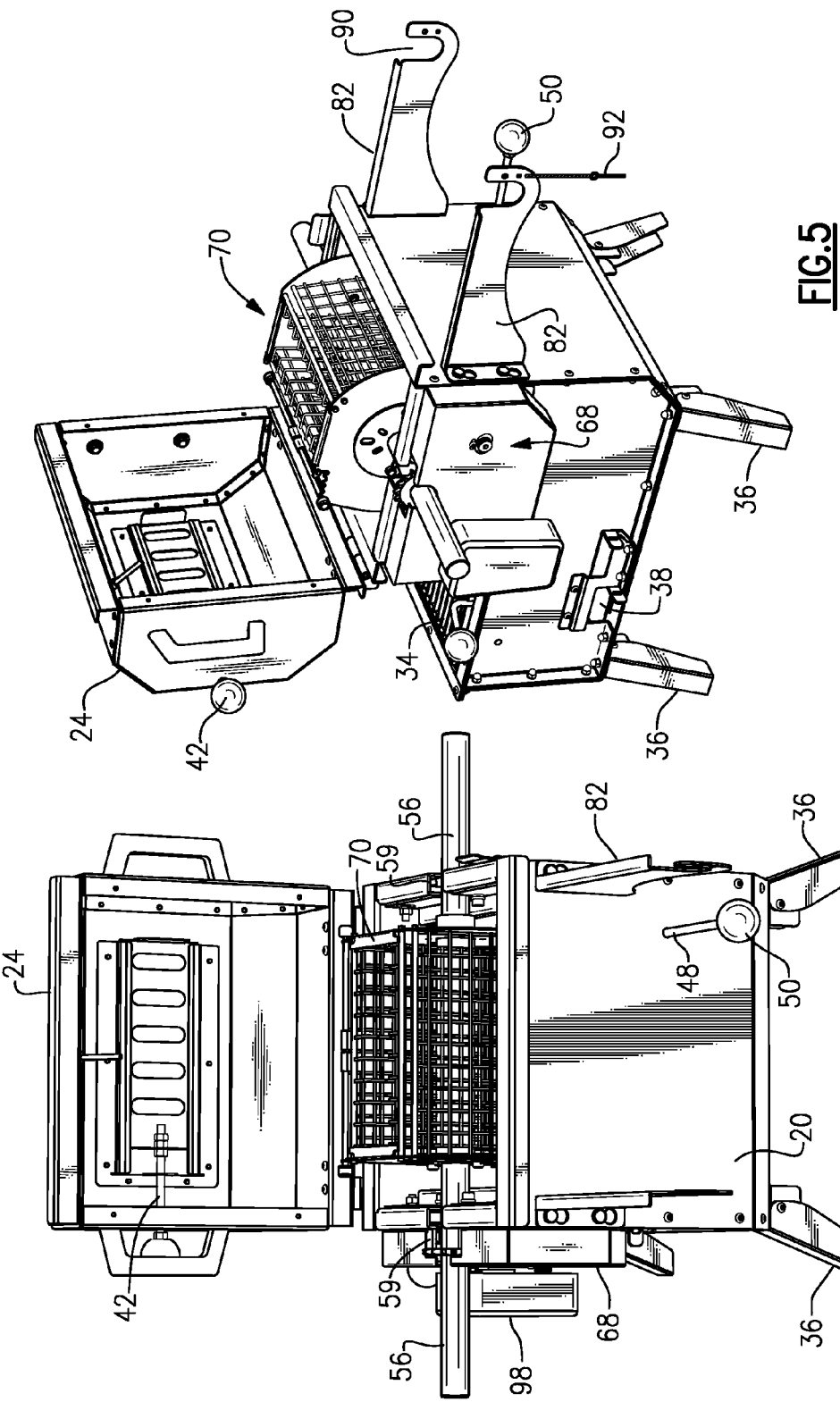

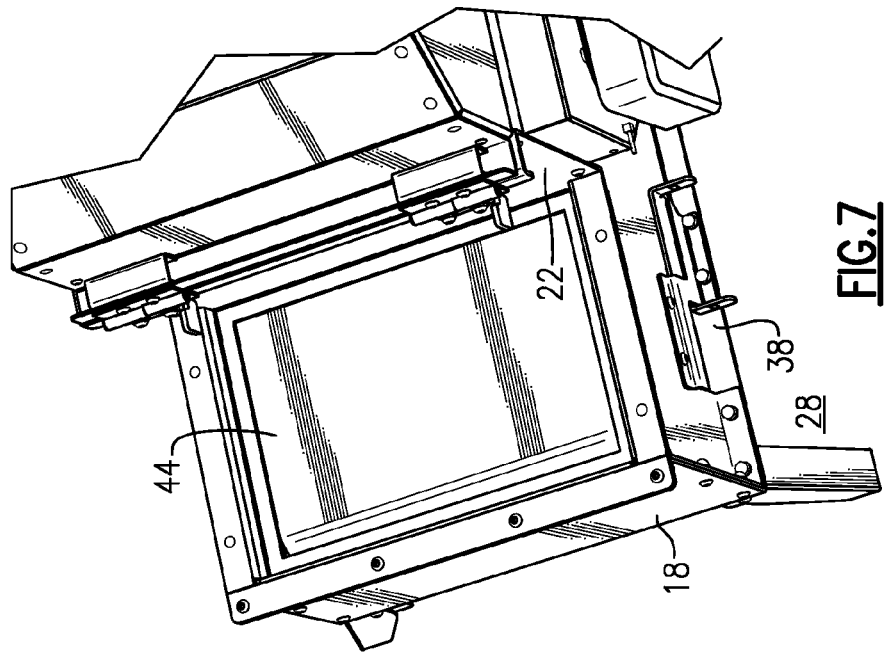
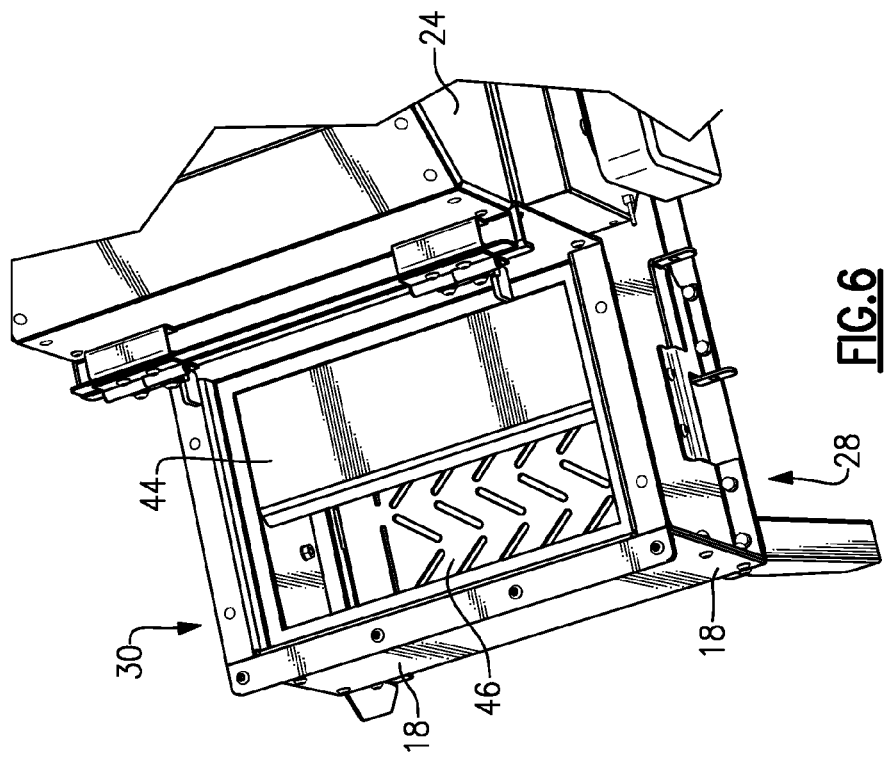

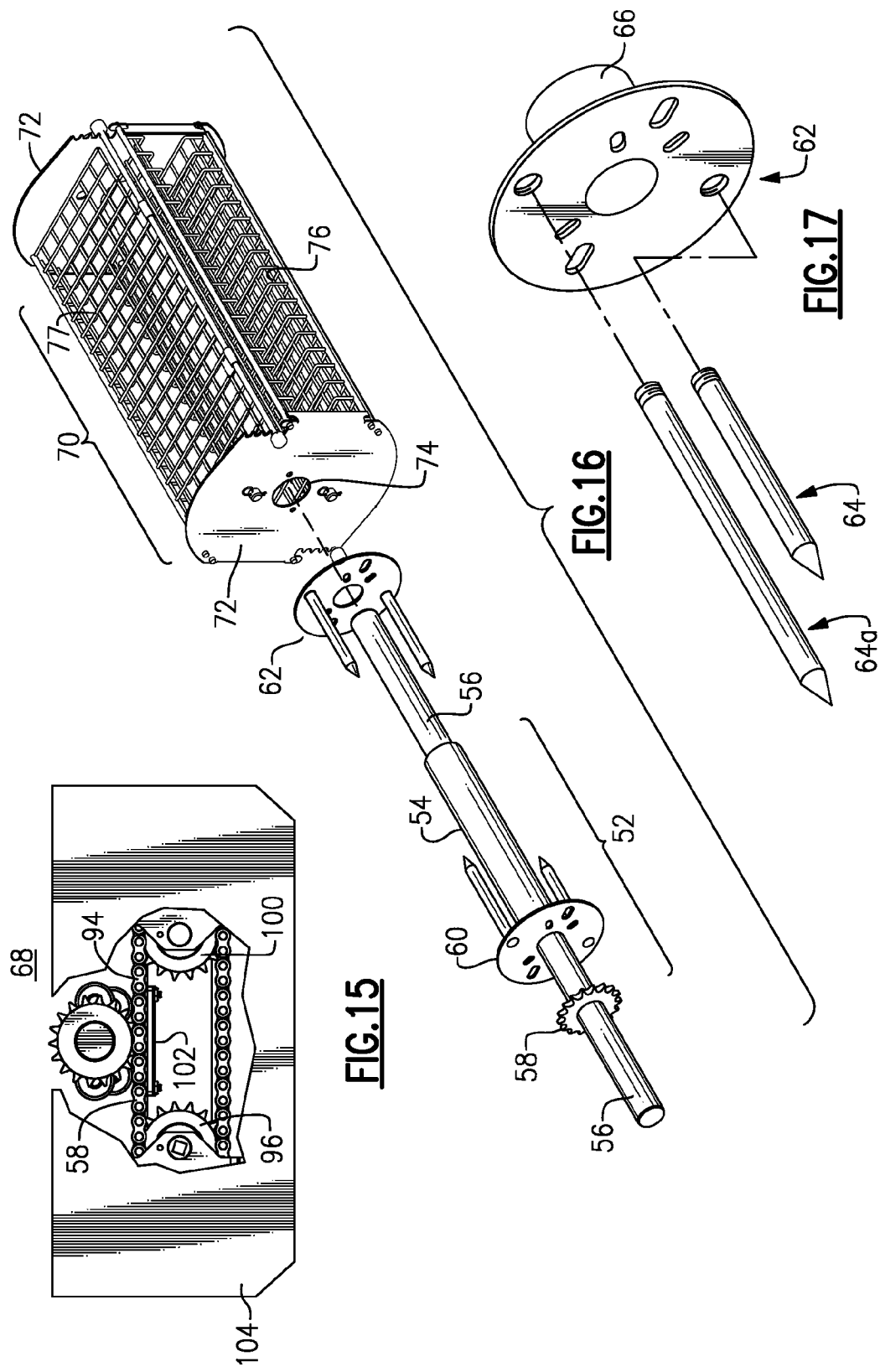

CHARCOAL BARBECUE ROTISSERIE GRILL COOKER

BACKGROUND OF THE INVENTION

This invention is directed to a charcoal cooker that can be used as a grill for cooking steaks or can be used as a rotisserie for slower cooking of ribs, chicken, turkey, or the like.

In a charcoal cooker of this type, there is typically a main cooker body, i.e., box or bowl, with a grille removably situated at the top and a lid that can be opened for access to the grill and closed for cooking with slow, uniform heat. A rotisserie spit, i.e., a rod that extends transversely across the cooker, is adapted to hold one or more whole chickens, turkeys, or similar items, and mates with a drive for rotating the spit rod during the cooking process. In some cases, a rotisserie basket is used, i.e., for barbecue cooking of pork ribs, fish, large slabs of meat, vegetables, and other items.

The typical rotisserie requires the spit rod and the basket to be interchangeable, but does not have a spit rod that converts to a rotisserie basket or vice versa. Rotisserie grilles have been lacking in means for providing uniform cooking heat over the extent of time needed for roasting, which can exceed an hour, and there has been no effective means provided for holding the spit rod or rotisserie basket for loading of the meat or for removing the cooked meat, or for holding the spit rod or basket outside the cooker box or body for basting or for adjusting the meat items during the cooking process.

There has been a need for a spit rod that is convenient to lift to insert into the rotisserie spit drive, and in which the handle ends remain cool to the touch, and there has been a need for an effective motorized spit rod/basket drive that engages the spit rod when the same is dropped into place on the cooker body, and which reliably rotates the spit rod and the food items at a uniform speed without slipping or jumping.

A number of rotisserie grill cookers have been proposed, which have a frame that holds a fire bowl or fire box and in which a spit is rotated by an electric motor drive, which may include a chain and sprocket mechanism.

Duran U.S. Pat. No. 5,140,896 shows a chain drive for a barbecue spit rod, but relies on intermediate rollers to rotate the rod. Other chain or gear driven rotisserie spit rods are described in Unruh et al. U.S. Pat. No. 5,431,318 and in Danen U.S. Pat. No. 5,801,357. Barbecue cookers that can be converted between grill and rotisserie are described in Rummel U.S. Pat. No. 5,536,518 and Hopponnen U.S. Pat. No. 6,437,291. A rotisserie flavor barrel, which is a combination of a spit rod and a grill basket, is shown in Gabrielle U.S. Pat. No. 7,478,568. A charcoal cooker that has a coal fire box disposed to one side of a main cooker body is shown in Killion Publication US 2005/0155498.

None of the proposed devices of the prior art have been ideally suited for roasting or rotisserie cooking of a number of birds on a spit, as well as being also suited for rotisserie cooking of slabs of meat, ribs, or roasts in a grille basket. None of the cooking devices of the prior art have provided a holder or hook arrangement for supporting the rotary spit rod or grill basket so it can be loaded with the meat articles, or so that the meat can be properly dressed or basted at a station at or near the barbecue grill or cooker. None of the proposed barbecue cooker devices have suggested or described a spit rod that can be easily converted into a grill basket, or which can be converted from a size for cooking smaller birds (i.e., chickens) to a size for cooking larger birds (turkeys).

OBJECTS AND SUMMARY OF THE INVENTION

Accordingly, it is an object to provide a charcoal cooker of an improved design that is simple to use and can be easily and quickly reconfigured for grilling or rotisserie cooking, either on a spit rod (or rods) or in a rotisserie basket.

It is another object to provide a cooker that includes arms or hooks removably mounted on the body of the cooker and which support the spit rod or basket in front of the grill for loading or removing meat, or for dressing or basting.

According to an embodiment of this invention, a charcoal-fired rotisserie grill oven has a main cooker body with a bottom, back and front walls, and side walls; a lid hinged to the cooker body; and a tubular spit rod that can be removably mounted in receptacles formed at the top edges of the side walls of the cooker body. In embodiments of the invention, the spit rod is formed of a main tubular hollow cylindrical spit member with a length dimension along its axis to fit between the cooker side walls. This main tubular member has a predetermined diameter, and there are first and second tubular hollow end members, of a smaller diameter, that extend axially from its ends, and thus extend axially beyond the side walls of the cooker body. A sprocket wheel is mounted on the first tubular end member. There is a sprocket drive situated on one of the side walls of the cooker body for engaging the sprocket wheel and rotating the spit rod.

The spit rod can be constructed with a ring flange affixed onto the end of said main spit member at its junction with the first end member. This may incorporate a retaining ring that is slidably movable on the spit rod main spit member, and which has a central opening of that same predetermined diameter, and means for releasably holding the retaining ring in place on the main spit member.

The rotisserie spit rod ring flange and its retaining ring (i.e., spike rings) are each provided with female threaded apertures, and screw-in removable spikes or spears have male threads adapted to engage the apertures and screw into place in the spike rings. A rotisserie basket assembly can be removably fitted onto the main tubular spit member of the spit rod, so the spit rod can be converted to a rotisserie basket. The basket assembly has a pair of end plates each with a central opening of the same diameter as the spit rod for sliding onto or off the main spit member; and two or more basket members are supported between the end plates and situated radially between the central opening(s) and rims of the end plates. Mesh cover door members are each being positioned radially outward of an associated one of the basket members; each has a pivot member at one side thereof and pivoted in said end plates, and each has a spring bar at a side thereof opposite the pivot member. The spring bar releasably engages detent structure in the basket assembly end plates.

Favorably, the sprocket drive can be formed of a sprocket chain, a driven sprocket and at least one additional sprocket (i.e., idler sprocket) such that the sprocket chain travels in a closed loop. The sprocket chain engages an under side of the spit rod sprocket wheel, so that the spit rod can be dropped into engagement with the sprocket drive and can be lifted out of engagement.

A support for the spit rod, in the front or proximal area of the cooker, can be formed of a pair of arms that the user can mount onto and remove from structure at the left and right end portions of the front wall of the main cooker body. Each of these arms projects horizontally and proximally of the main cooker body, and each of these arms has an upward-facing recess or "hook" formed at its proximal end (such that the U-shaped "hook" has an open top and closed bottom). Each arm thus can support a respective end member of the spit rod. The mounting structure at the front wall of said main cooker body can comprise a plurality of hanger members affixed at the left and right end portions, hanger member being each formed of a button head supported on a stem. In that case, each removable arm has a plurality of cooperating apertures formed at its distal end and adapted to mate with the hanger members.

One of the many possible embodiments of the charcoal barbecue cooker of this invention can be in the form of a portable "camper" or "picnic" grill, adapted for picnics, tailgate parties, and other use where the charcoal cooker is to be transported to a picnic area, and then set up for rotisserie cooking and/or grilling.

In this embodiment, the main cooker body has left and right generally L-shaped sides, each having a shorter rear (distal) portion and a taller forward (proximal) portion, a front wall, an intermediate vertical wall, and a rear wall. A rear fire compartment is defined between the rear portions of the L-shaped sides, the rear wall, and the intermediate wall. A front cooking compartment is defined between the forward portions of the L-shaped sides, the intermediate wall, and the front wall. Each of the front cooking compartment and the rear fire compartment has an open, generally rectangular top, and a stainless steel grille can be situated at either location. The front cooking compartment has a lid hinged to its open top, and this lid can be closed over the open top.

A horizontal baffle plate is slidably movable across the rear fire compartment and across the front cooking compartment to control heat flow between the fire compartment and the cooking compartment. Favorably, the baffle plate includes a control rod projecting through the front wall of the main cooker body and a handle at a proximal end of the control rod, adapted to permit the user to slide the baffle plate to the desired position.

The spit rod rotisserie receptacles are formed at the forward portion about midway along the sides at the top of the cooking compartment and are adapted to receive a spit rod of the type mentioned earlier. At one side there is a rotary drive that engages the sprocket wheel of the associated spit rod.

The cooker has support legs attached to the bottom of the main cooker body, these legs being pivoted to permit folding against the bottom of the main cooker body and unfolding to a support position to hold the main cooker body above a support surface.

The spit rod can take the form of the tubular spit rod described earlier, with a removable ring flange with spiked for chicken and turkey, and a grill basket that can slide onto the rod. A pair of removable support arms or hooks are provide, for holding the spit rod and/or grill basket for loading the meat or for removing the meat after it is cooked.

The rotisserie grill type barbecue cooker of this invention can be embodied in a large range of sizes, from the small camper or picnic size through a number of intermediate sizes suitable for larger groups, to large trailer-mounted cookers, which may be capable of operating with two, three or more spits (or grill baskets). Each may be capable of being operated with a separate fire box attachment and each may have a chute or gate for adding charcoal during cooking.

In embodiments of this new concept, the main body and lid are favorably all aluminum alloy, and the legs, grille, rotisserie spit rod, basket, and pins are stainless steel. The lid, legs, and spit rack hooks (on the front of the cooker body) are all easily detachable without tools. The cooker body is about favorably about 18 inches deep, and the charcoal grate that supports the charcoal fuel can be moved between a lower position (for rotisserie cooking) and an upper position (for grilling). The spit rod is all stainless steel, with a wider-diameter central portion and a smaller diameter portion at each end. The ends serve as handles and remain cool to the touch, so the rotisserie spit can be lifted out by grasping the ends, so that the cooked meat can be removed for serving. The chain drive that engages a sprocket on one end of the spit rod allows the spit to be dropped into place and later simply lifted out. In smaller versions, the motor is removable, and either a 110 volt AC gear motor or a 12 volt DC gear motor may be used.

The lower part of the cooker body may have one or more chutes for adding charcoal pieces during cooking without opening the lid (for cooking a large bird or roast, about three hours of cooking is needed, so some new charcoal is needed periodically). There can be a slide gate to admit the charcoal, which is normally closed to control air through the chute opening. Also, a smoker basket (with wood chips) can be inserted at the chute opening. An optional attachment for external heat generation can be fitted onto the port that is usually occupied by the coal chute, so the device can be used as an oven for baking.

The spit rod has a pair of washer-like flanges or spike rings on which there are spikes, i.e., spears or pins. These are detachable from the flanges, so that longer spikes can be used for turkeys and smaller spikes for chickens. The generally cylindrical rib basket attachment can be positioned on the spit rod in place of the flanges or rings for roasting slabs of meat, i.e., pork roast, ribs, fish steaks, etc.

Air venting can be tightly controlled, by means of vents on the lid and at the lower part of the body, to permit the temperature in the cooker to be controlled. A lower body vent at the very bottom at one side allows the body to be hosed out when cleaning it.

The above and many other objects, features, and advantages of this invention will become apparent from the ensuing description of a selected preferred embodiment, which is to be considered in connection with the accompanying Drawing.

BRIEF DESCRIPTION OF THE DRAWING

FIG. 1 is a left-side perspective view of a charcoal barbecue cooker for grill and rotisserie cooking, according to one preferred embodiment of this invention.

FIG. 2 is a left-rear perspective view of this embodiment.

FIG. 4 is a front perspective of this embodiment.

FIG. 5 is a right-front perspective view of this embodiment.

FIGS. 6 and 7 are partial perspective views of the rear fire-box portion of this embodiment, showing the slide baffle thereof in a partly open and in a closed position, respectively.

FIG. 10 is a front view showing the rotisserie spit rod thereof configured in its spit configuration, i.e., for rotisserie cooking of chickens, turkeys, or the like.

FIG. 15 is a partly cutaway elevation showing the chain and sprocket drive for the spit rod, according to embodiments of this invention.

FIG. 16 is an exploded view of the spit rod with spike ring and basket attachment, according to embodiments of this invention.

FIG. 17 shows detail of the spike ring, with interchangeable bird spikes.

DETAILED DESCRIPTION OF THE PREFERRED EMBODIMENT

Figure 3:
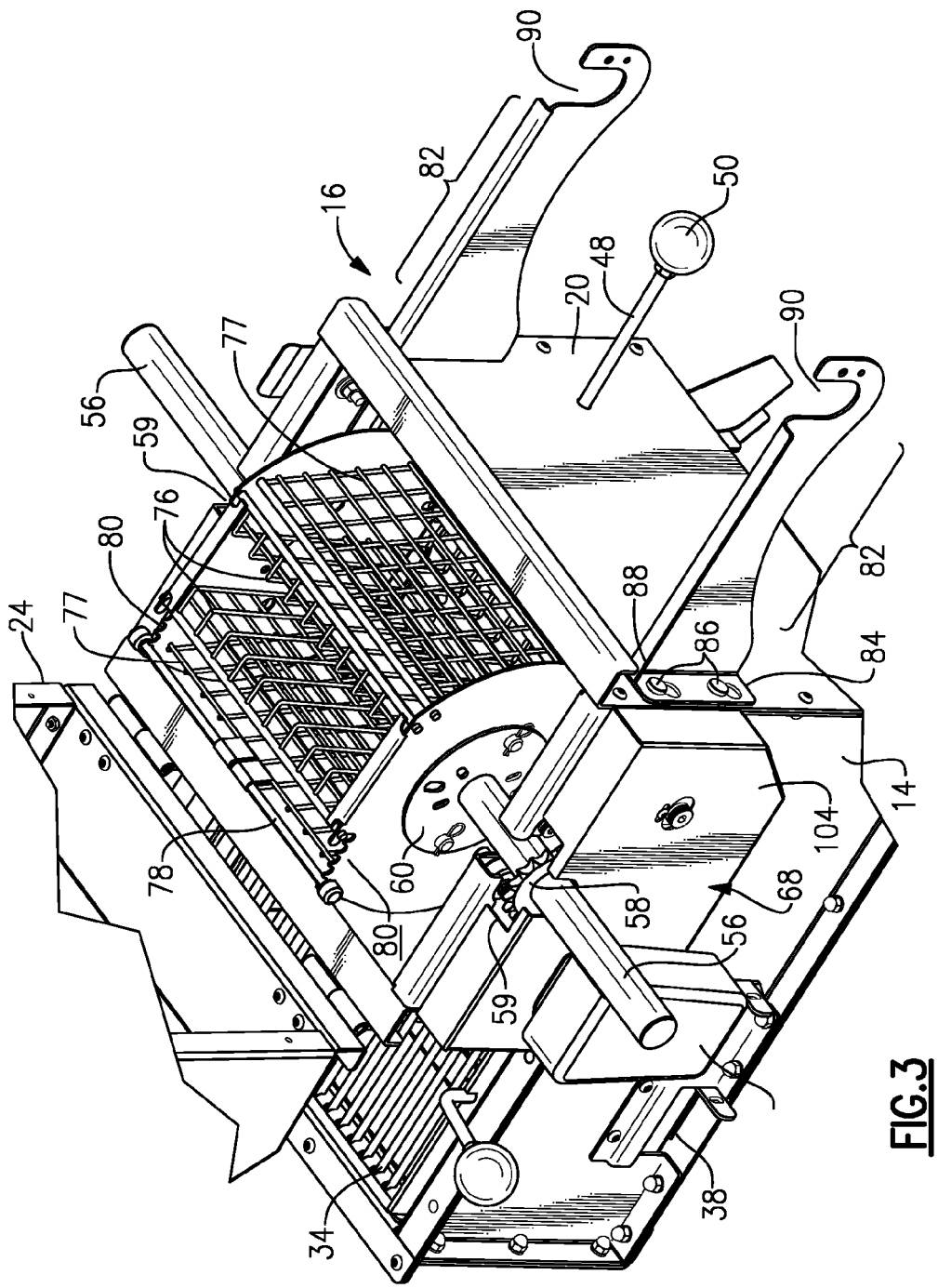
FIG. 3 is a top perspective view of this embodiment, showing the rotisserie grill basket arrangement.
Figure 8:
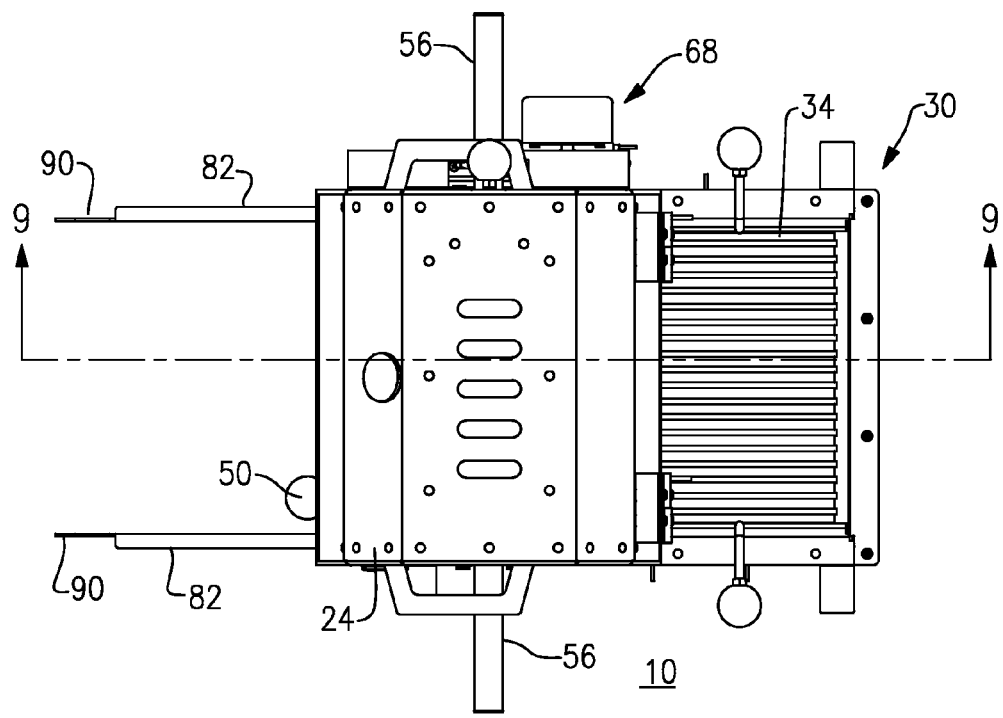
FIG. 8 is a top plan view of this embodiment.
Figure 9:
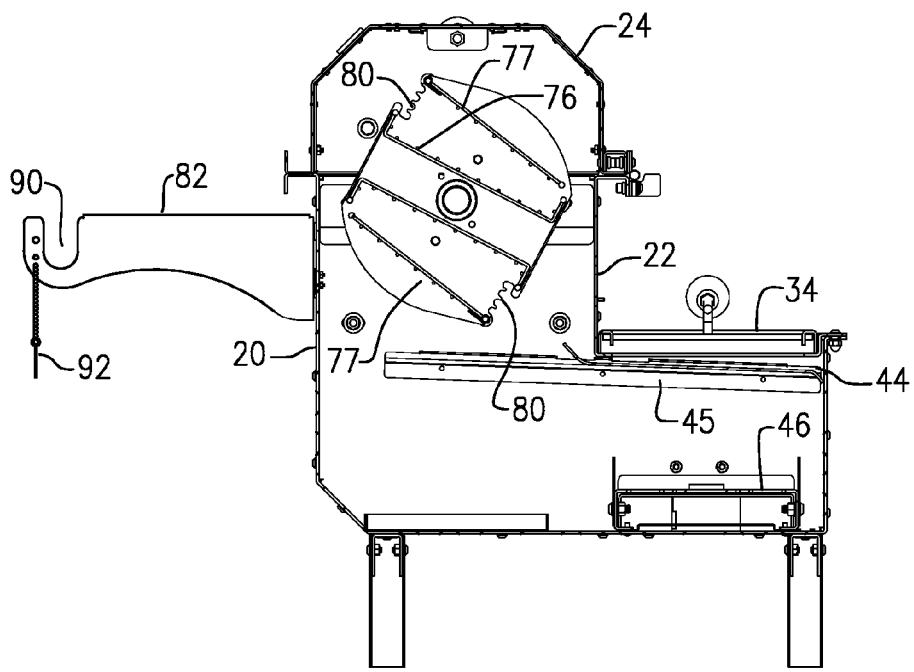
FIG. 9 is a sectional elevation taken along the cut line 9-9 of FIG. 8.

With reference to the Figures of Drawing, FIGS. 1 to 10 thereof illustrates an embodiment of the rotisserie grill cooker of this invention. The illustrated embodiment is a compact version that is suited for camping, picnic use or tail-gating use where the food is intended to feed a smaller group of persons. The cooker is portable and can be carried without difficulty in a vehicle and set up at a picnic or camping area or at a stadium parking lot.

As shown in FIGS. 1 to 5, the camper-size grill or rotisserie cooker 10 has a main body 12, preferably formed of a sturdy aluminum alloy, and which is taller at the front or proximal side (i.e., to the right in FIG. 1) and lower at the rear or distal side. The cooker body has left and right sides 14 and 16, which are of a generally L-shaped configuration, and also has a vertical rear wall 18, front wall 20 and intermediate wall 22 midway between the front and back walls 18, 20. The bottom or base is obscured in these views. A vaulted lid or cover 24 is hinged to the body 12 at the top of the intermediate wall 22, as shown. In this construction, the rear and intermediate walls 18 and 22 define a rear fire box portion 26 between them, and the front wall 20 and intermediate wall 22 define a forward cooking portion 26 of the cooker 10. The fire box portion 26 and the cooking portion 28 each have a rectangular open top 30 and 32, respectively, and each of these has substantially the same dimension. A generally rectangular cooking grill 34 is shown positioned on the open top 30 of the fire box portion, but this can be moved, if desired, to the open top 32 of the cooking portion 28. At the base of the cooker body 12 there are four legs 36, one mounted at each corner. These can be folded down for travel or storage.

There is a vent 38 at the lower edge of the left side wall 14 for controlling combustion air entering the fire box portion 26. This vent can be opened to allow access for a hose or sprayer, so that water can be sprayed in for cleaning purposes. Another controllable vent 40 is formed on the lid 24, as a series of vent slots, with a control rod 42 protruding to one side for adjusting a baffle at the vent 40.

As also shown in FIGS. 6 and 7, a slide baffle or plate 44 can be moved by sliding along side flange supports 45 (see FIG. 9) for partially or fully opening/closing the open top 30 of the fire box portion 26. The slide baffle also controls heat flow into the cooking portion 28. FIG. 6 also shows a fire grate 46 within the fire box portion 26 of the cooker body. The fire grate 46 supports the charcoal fire, and can be adjusted between high and low positions, as desired. FIG. 7 shows the slide baffle 44 being completely closed, so all heat flow is directed forward into the cooking portion 28. When the slide baffle 44 is in this closed position, it can also serve as a cooking surface or stove top, for cooking or heating items such as rice, fresh corn, vegetables, or coffee. A control rod 48, which projects forward through the front wall 20, and has a knob handle 50 at its end, is used for adjusting the position of the slide baffle 44.

The rotisserie spit rod and grill basket assembly, also embodying this invention, and shown in the drawings, can be seen in particular in FIGS. 1, 3, 4, and 5. The rotisserie spit rod 52 (see also FIGS. 10, 16 and 17) is constructed of hollow tubular stainless steel, and has a main central tubular portion 54 and also has left and right hollow tubular stainless steel end portions 56, which are of smaller diameter than main portion. The end portions remain relatively cool during rotisserie cooking, and can serve as handles for the user to lift the spit rod 52. The left tubular end portion 56 is provided with a sprocket wheel 58 which engages a sprocket drive mechanism to be described later and which rotates the spit rod.

The spit rod can be used for cooking chickens, turkeys, or other birds, pigs, or other meat animals that can be slid onto the spit rod. The spit rod is provided with a left spike ring 60 affixed at the left side of the main central portion 54, and has a removable right spike ring 62 slidably positioned at the right side of the main central portion 54 of the spit rod. As shown e.g. in FIG. 17, the spike rings are provided with interchangeable smaller spikes 64 (e.g., for smaller birds such as chickens) and larger spikes 64a (for larger birds such as turkeys). These spikes are threaded at one end, and can be twisted into place in threaded openings in the respective spike rings 60, 62. The removable right spike ring 62 also has a locking ring 66 that secures the spike ring 62 to the spit rod.

A motorized sprocket drive assembly 68 is mounted on the left side wall 14 of the cooker body, and is adapted to engage the spit rod sprocket 58 when the spit rod is dropped into place in the cooker portion. As shown, there are cutouts or recesses 59 at the top edge of each of the left and right sides to receive the ends of the spit rod. Details of this are provided later.

A grill basket assembly 70 is designed to be interchangeable with the spike ring 62 and can be mounted on the spit rod 52 for rotisserie cooking of slab meat articles, ribs, fish, steaks, etc. The basket attachment 70 has a pair of generally disk-shaped end plates 72, each being provided with a center hole or opening 74 that fits onto the main central portion 54 of the spit rod. These define the axis of the spit or rotisserie basket, and the spit rod is inserted though these openings 74. One of the end plates 72 mounts against the fixed spike ring 60 and is secured to it so that the grille basket rotates together with the supporting spit rod. There are a plurality of mesh basket members 76 distributed at even intervals about the axis; in this embodiment there are two mesh basket members 76 opposite one another across the center axis, and supported by the left and right end plates 72. For each basket member 76 there is a mesh door or cover 77 situated radially outside the basket member, with a pivot rod at one end that is supported between the two end plates, and with a spring rod 78 at the opposite end of the door or cover 77. The spring rods 78 engage in detents or teeth 80 that are formed along an edge or rim of each of the end plates 72, so that the doors or covers 77 hold the meat articles in place in the basket members. These can be opened easily by the user to remove the cooked meat articles for serving.

The rotisserie cooker 10 is also provided with a pair of support arms or hooks 82, which are removably attached to the front wall of the cooker body, and which project proximally, i.e., horizontally and forward from the cooker front wall 20. There is one support arm 82 at the left edge and one at the right edge, and these are used to support the rotisserie spit rod and/or grill basket assembly for loading meat articles before inserting the spit rod and/or basket attachment into the cooker.

Each support arm 82 has a mounting flange 84 at the distal end, with upper and lower openings 86 that fit onto support members 88, at left and right edges of the front wall 20. The support members 88 are favorably each formed of a stem with a button or disk-like head. At the proximal ends, the support arms 82 each have a generally U-shaped receptacle 90, formed open at the top and closed at the bottom and sides, and each supports one end of the tubular spit rod 54. A pin 92, shown hanging on a chain or metal lanyard, can be inserted through hole in the support arm receptacle 90 and a hole in the associated end plate or spike ring, to hold the spit rod and/or basket assembly against rotation during loading of the meat, during basting, etc.

The spit rod drive assembly 68 is shown in more detail in FIG. 15. The drive assembly is in the form of a chain drive in which links of a chain 94 engage the sprocket teeth of the spit rod sprocket wheel 58. The drive chain 94 travels in an endless loop around a driven sprocket wheel 96 (driven by an electric gear motor 98) and an idler sprocket wheel 100. A guide bar 102 positioned beneath the chain 94, where the chain engages the sprocket wheel 58, supports the chain to avoid slippage or skipping between the chain and sprocket, so that the spit rod rotates at a steady rate, even in the case of an unbalanced load. A stainless steel casing or cover serves as a shroud over the chain and sprockets, and also supports the gear motor 98, which can be slipped off from supporting structure and removed.

In this embodiment the drive motor is a standard 110 volt AC gearmotor, but this may be interchanged with an alternative 12 volt DC gear motor which can be powered from a marine or automotive electrical system.

In other possible embodiments, where the rotisserie cooker is larger for cooking for a much larger group, the sprocket drive can be powered by a larger motor, and can accommodate two or three (or more) spit rods.

Still other aspects of the invention can be explained in respect to another illustrative embodiment, as shown in FIGS. 11 to 14. Here, elements of this embodiment which correspond to similar elements in the first embodiment, are identified with similar reference numbers, but raised by 100. In most cases, the elements serve the same purpose and function in the same way, so that a detailed description thereof can be omitted. This embodiment is a larger rotisserie cooker unit e.g. for backyard use, with larger dimensioned body 112, shown with a front wall 120, sides 114, 116 and a rear wall 118, forming a cooking portion. The legs 136 are taller than in the first embodiment, and can be provided with wheels or rollers. The cooker is provided with a hollow tubular spit rod and grill basket attachment, similar to that described earlier, with a similar sprocket drive 168 and similar spit rod support arms 182.

Figure 11:
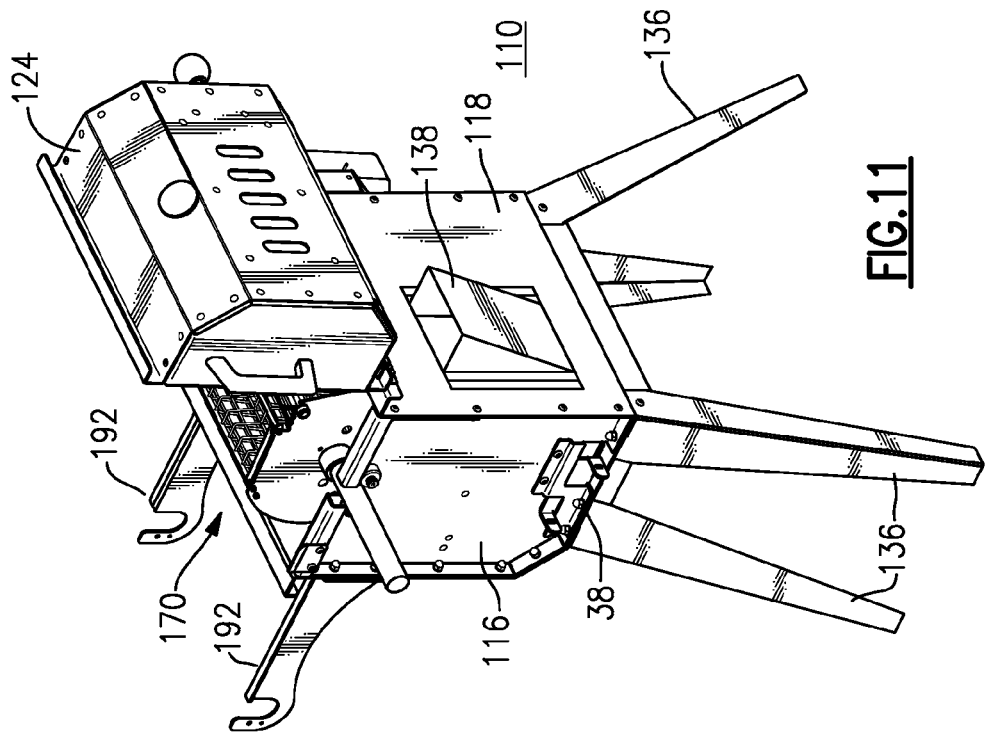
FIG. 11 is a perspective view of another embodiment of this invention.
Figure 10:
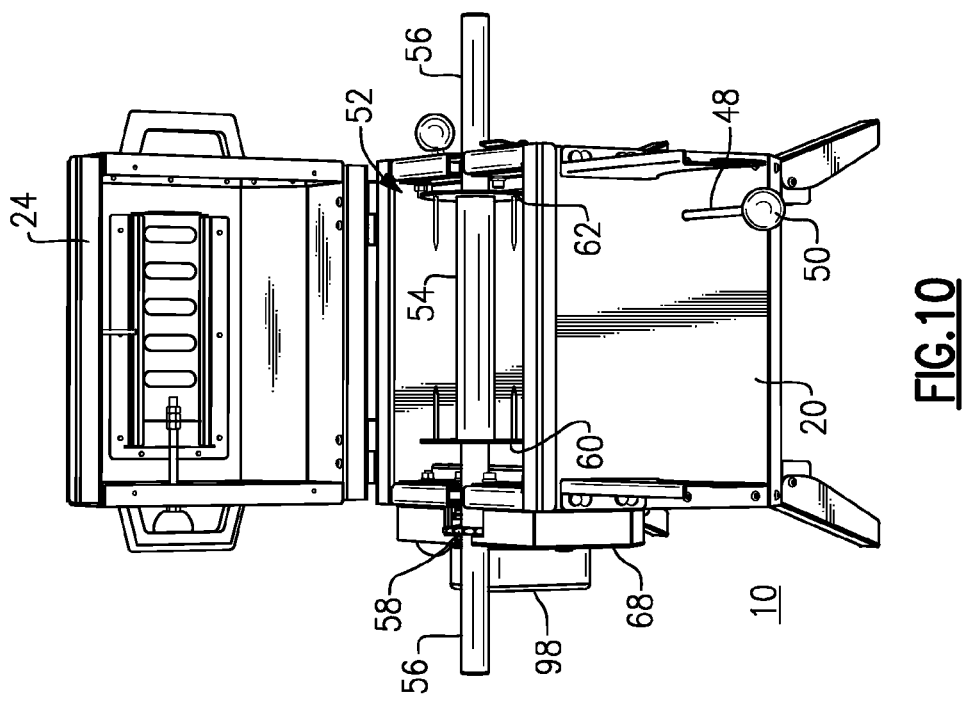
Figure 13:
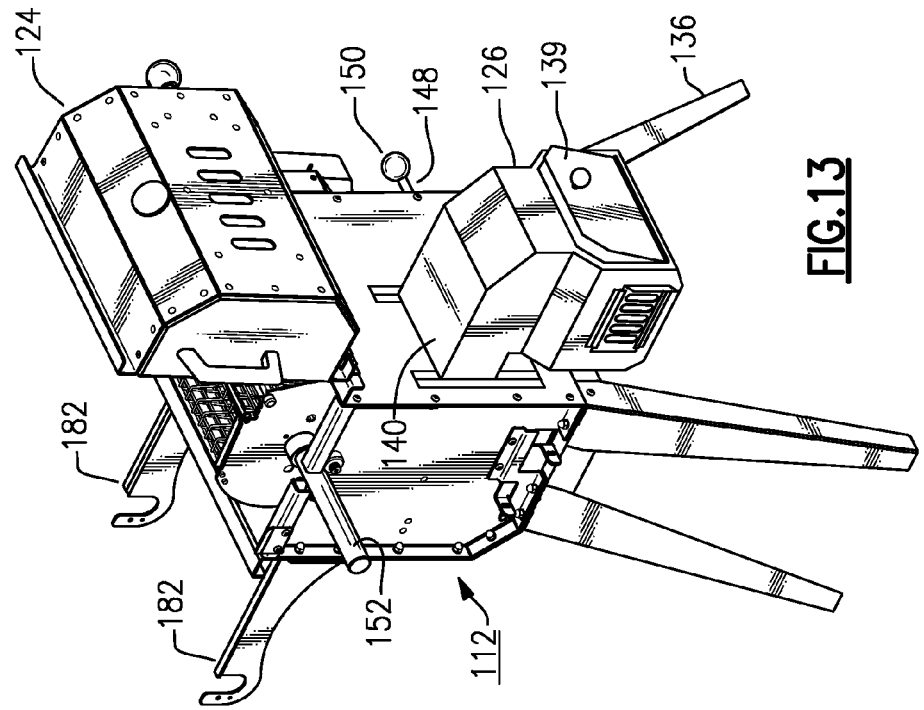
FIGS. 12 and 13 are a side elevation and perspective view, respectively, of this embodiment illustrating a separate fire box attachment.
Figure 12:
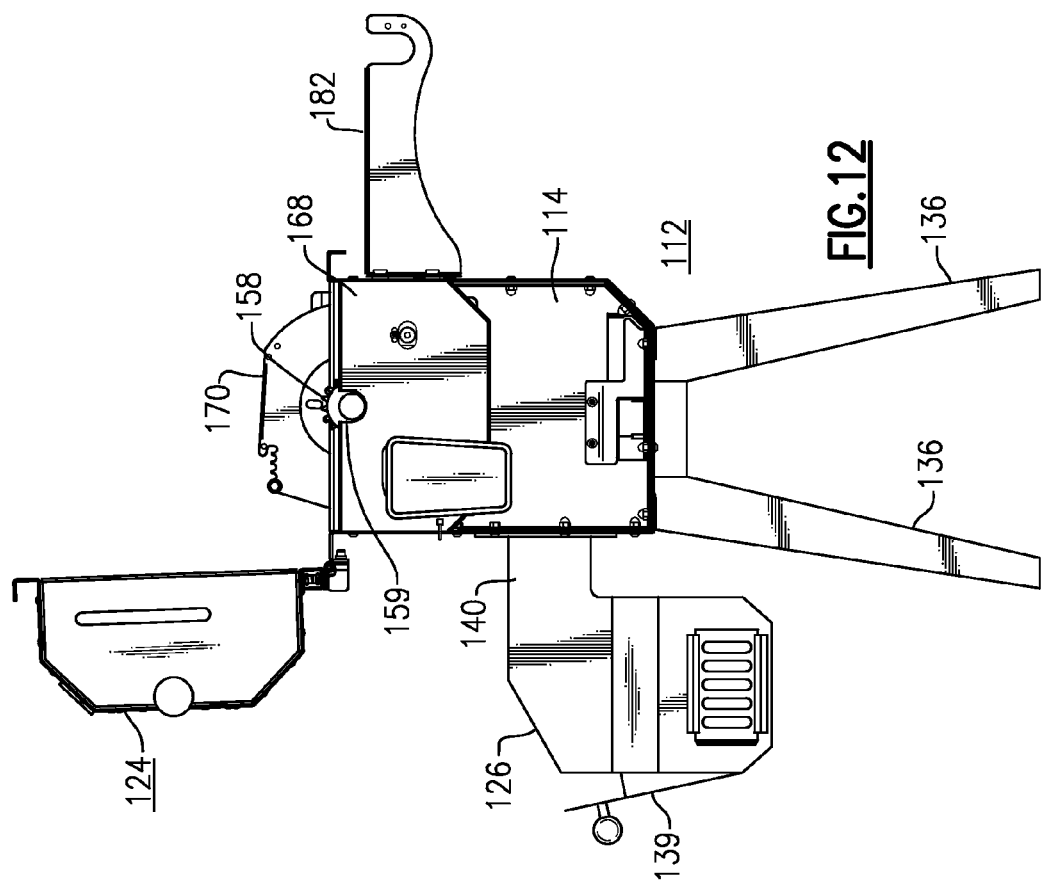

In this embodiment, a coal chute 138 is provided on the back wall 118, as shown in FIG. 11 and if it is desired to add charcoal, the coals dropped in the chute 138 as needed. Then an internal slide plate 144 (FIG. 14) can be closed. An external heat box attachment 126 can fit interchangeably with the coal chute at this location, as shown in FIGS. 12 and 13. The chute 138 can be removed from mounting slots along side the chute opening, and the external fire box attachment 126 can be fitted in place there. The attachment 126 has a door 139 that can be opened for adding charcoal, and a neck 140 that connects with the main cooker body 112. A vertical slide plate baffle 144 (See FIG. 14), parallel to the back wall 118, slides across the opening for the chute 138, and can be used to control the heat flow from the fire box attachment 126, or to control air flow through the loading chute 138. A rod 148 projects through one side wall 114 and has a knob handle 150 for moving the slide baffle, as needed. With the external fire box attached, the cooker can be used as an oven for roasting or baking.

As with the previously described embodiment, this rotisserie cooker 110 also has a motorized chain-and-sprocket drive 168, located at one receptacle 159, for receiving and driving the drive sprocket 158 of an associated tubular stainless steel spit rod 152, which can be adapted as a rotisserie basket by addition of a basket attachment 170. The rotisserie cooker has a pair of detachable support arms or hooks 182, similar to those of the first-described embodiment, for holding the spit rod and/or basket attachment.

Figure 14:
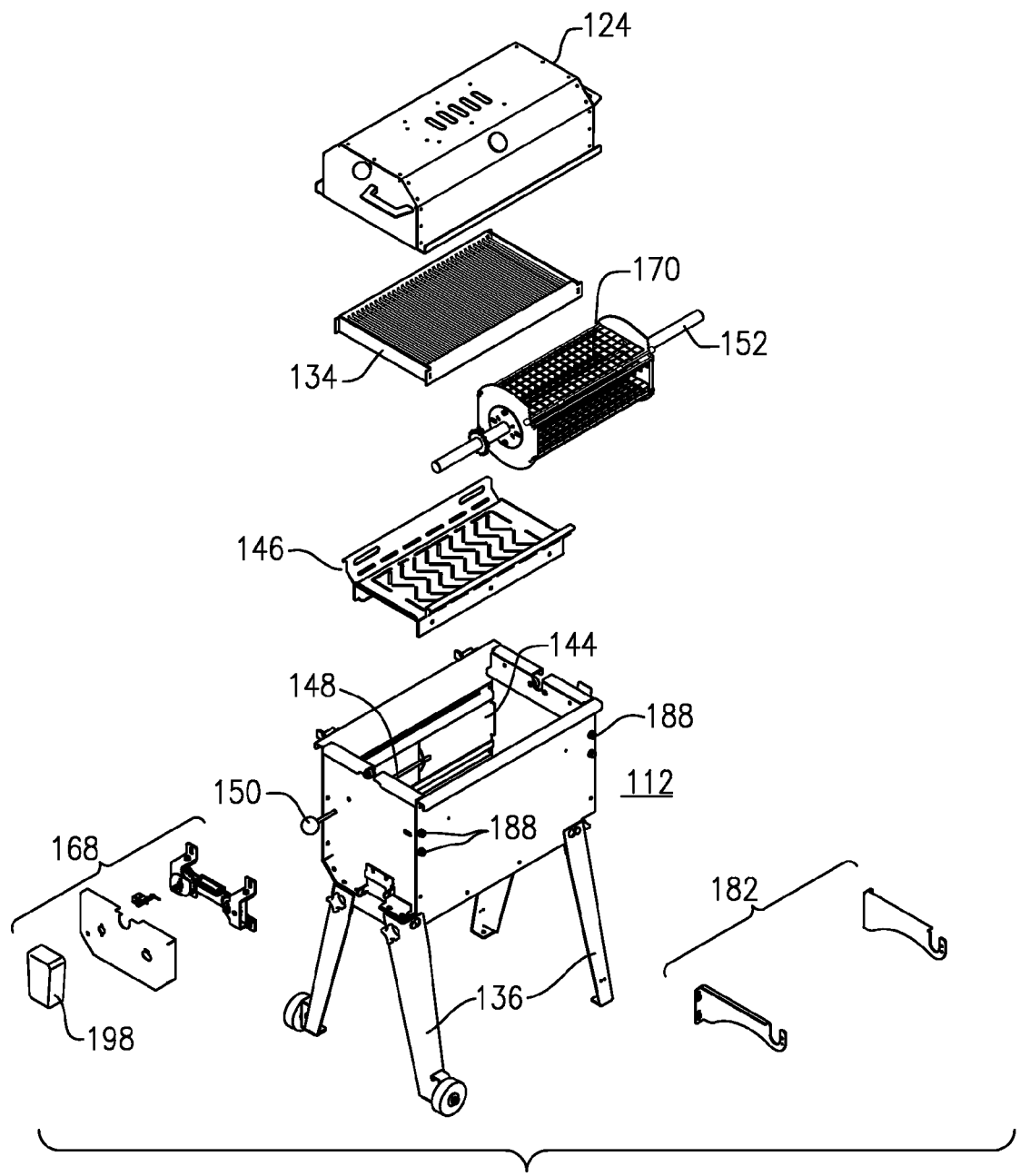
FIG. 14 is an assembly view of this embodiment.

FIG. 14 is an assembly view of this embodiment, showing the cooker body 112, grill 134, lid 124, spit rod 152 with removable spike ring 162, grill basket assembly 170, and charcoal grate or fire grate 146. The fire grate can be set at a high position within the cooker body for grilling, or at a low position for rotisserie cooking.

The sprocket drive 168 is shown with a detachable motor 198, as well as a frame with sprocket assembly and the sheath or cover.

Additional embodiments can include an intermediate size rotisserie grill cooker for competition cooking, and can include a very large barbecue grill with a body to accommodate two or more spit rods, where there is a need for feeding a larger number of persons, such as a fundraiser or banquet.

Other features present, but not specifically described, include a temperature gauge or thermometer positioned on the hood 24 or 124, as well as other adjustable vents to permit accurate control of cooking temperatures. Not shown are a cooking tray that rests upon the grill 34 or 134, i.e., for roasts or meat articles where the juices are to be retained.

Favorably, the cooker body is made of a sturdy aluminum alloy, and the remaining parts, including the grills 34, 134, fire grates 46, 146, the spit rod 52, 152 and grill basket assembly 70, 170 can be made of a stainless steel. This construction is extremely durable, with a long service life.

It should be understood that the illustrated embodiments, of particular sizes and shapes, are representative of rotisserie cookers of a range of sizes for different specific applications. Embodiments of this invention should not be limited only to those employing charcoal as a fuel source.

While the invention has been described hereinabove with reference to selected preferred embodiments, it should be recognized that the invention is not limited to those embodiments. Rather, many modification and variations would present themselves to persons skilled in the art without departing from the scope and spirit of this invention, as defined in the appended claims.

I claim:

1. A charcoal-fired rotisserie grill oven for cooking meat comprising
    a main cooker body having a bottom, back and front walls, and side walls;
    a lid hinged to said cooker body;
    a tubular spit rod removably mounted in receptacles formed at top edges of the side walls of the cooker body, including a main tubular hollow cylindrical spit member defining an axis of the spit rod, the main tubular spit member being dimensioned to fit between said side walls and having a predetermined diameter, first and second tubular hollow end members extending axially from ends of said main spit member, each of the first and second tubular hollow end members having a diameter smaller than said predetermined diameter of the main hollow tubular cylindrical spit member and each of said first and second tubular end members extending axially beyond the side walls of the cooker body, and a sprocket wheel mounted on the first tubular end member;
    sprocket drive means situated on one of the side walls of the cooker body for engaging said sprocket wheel and rotating said spit rod;
    a pair of rigid arms removably mountable at left and right end portions of the front wall of said main cooker body, said arms each extending horizontally and proximally of the main cooker body, and each of said arms having a proximal portion fixedly positioned at a proximal end of the respective one of said arms, with an upward-facing recess therein, the upward-facing recess defining an open top and closed bottom, for receiving and supporting a respective end member of said spit rod , and further including means on the proximal portion of one of said arms for engaging a cooperating portion of said spit rod to hold the spit rod against rotation when the spit rod is being supported in said arms; and wherein the front wall of said main cooker body has a plurality of hanger members affixed at said left and right end portions, each said hanger member being formed of a button head supported on a stem; and wherein each said removable arm has a plurality of cooperating apertures formed at its distal end and adapted to mate with said hanger members.

2. The rotisserie grill oven according to claim 1 wherein said spit rod further includes a ring flange affixed onto the end of said main spit member at a junction with said first end member.

3. The rotisserie grill oven according to claim 2, comprising a retaining ring slidably movable on said main spit member, having a central opening of said predetermined diameter, and a locking ring affixed on said retaining ring removably securing the retaining ring onto said main spit member for holding the retaining ring in place on the main spit member.

4. The rotisserie grill oven according to claim 3, wherein said ring flange and said retaining ring are each provided with female threaded apertures located at predetermined positions on said ring flange and said retaining ring that are radially beyond said main spit member, and further comprising screw-in removable spikes having male threads adapted to engage said female threaded apertures and to screw into place in said ring flange and said retaining ring.

5. The rotisserie grill oven according to claim 2, comprising a rotisserie basket assembly adapted to be removably fitted onto the main tubular spit member of said tubular spit rod, including a pair of end plates each having a central opening of said predetermined diameter for slidably fitting onto said spit member; and a plurality of basket members supported between said end plates and situated radially between the central openings of said end plates and rims of said end plates, and one of said end plates being removably attachable onto said ring flange.

6. The rotisserie grill oven according to claim 5 wherein the rotisserie basket further includes a plurality of mesh cover door members, each of said door members being positioned radially outward of an associated one of said basket members, each of said door members having a pivot member at one side thereof and pivoted in said end plates, and each of said door members having a spring bar at a side of the respective door member opposite said pivot member and releasably engaging detent structure in said end plates.

7. The rotisserie grill oven according to claim 1, wherein said sprocket drive means includes a sprocket chain, a driven sprocket and at least one additional sprocket causing said sprocket chain to travel in a loop, and an upper side of said sprocket chain engaging an under side of said sprocket wheel, so that the spit rod can be dropped into engagement with said drive means and lifted out of engagement from said drive means.

8. A charcoal-fired rotisserie grill oven for cooking meat comprising
a main cooker body having a bottom, back and front walls, and side walls;
a lid hinged to said cooker body;
an elongated tubular spit rod removably mounted in receptacles formed at top edges of the side walls of the cooker body, including a main tubular hollow cylindrical spit member dimensioned to fit between said side walls and having a predetermined diameter, first and second tubular hollow end members extending axially from ends of said main spit member, each of the first and second end members having a diameter smaller than said predetermined diameter and each extending axially beyond the side walls of the cooker body, a fixed ring on one end of said main spit member, a removable spike ring at the other end of said main spit member, and a sprocket wheel mounted on the first tubular end member;
sprocket drive means situated on one of the side walls of the cooker body for engaging said sprocket wheel and rotating said spit rod; and
a rotisserie basket assembly adapted to be removably mounted on said elongated tubular spit rod for rotisserie cooking, the rotisserie basket assembly comprising:
first and second end plates each having a central opening, located on an axis of the rotisserie basket assembly, to receive said elongated tubular spit rod through said central opening, the end plates each extending radially to a rim, the first and second end plates being spaced axially from one another, one of said end plates being detachably mountable onto the fixed ring of said tubular spit rod;
a plurality of mesh basket members supported between said end plates, each being situated between the central opening and the rim;
a plurality of mesh cover door members each being positioned radially outward of an associated one of said mesh basket members, and each having a pivot rod at one side of the associated door member and pivoted in each of said end plates, and having a spring bar at a side of the cover door member opposite said pivot rod, the cover door members each being swingable about its associated pivot rod to an open position to permit loading one or more meat articles into the basket member, and to a closed position to retain the meat articles in the basket member during rotisserie cooking;
said end plates including detent means for releaseably engaging the spring bars of said cover doors to hold said cover door members closed during rotisserie cooking.

9. The rotisserie grill oven according to claim 8 wherein each said central opening is circular and is dimensioned to match the predetermined diameter of said cylindrical spit rod tubular hollow end members and is adapted to receive said cylindrical spit rod.

10. The rotisserie grill oven according to claim 8 wherein said detent means includes a plurality of rows of cutouts formed along respective edges of said first and second end plates, and each of said rows of cutouts being dimensioned to engage a portion of one of said spring bars.

11. The rotisserie grill oven according to claim 1, wherein the back wall of said main cooker body includes a coal chute adapted to permit coals to be dropped in through an aperture in the back wall into said main cooker body, and an internal slide plate slidably positioned across said aperture and adapted to slide open and closed to open and close said coal chute.

12. The rotisserie grill oven according to claim 1, further comprising an external fire box removably attached onto the back wall of said cooker body at an aperture in said back wall; and a vertical slide baffle plate extending parallel to said back wall at said aperture and slidably openable and closable across said aperture for controlling air flow through said aperture.

* * * * *